(12) United States Patent
King

(10) Patent No.: US 9,102,264 B2
(45) Date of Patent: Aug. 11, 2015

(54) MULTIPLE LAMP ELEMENT ADJUSTER FOR A VEHICLE

(75) Inventor: Robert King, Seymour, IN (US)

(73) Assignee: Valeo North America, Inc., Seymour, IN (US)

( * ) Notice: Subject to any disclaimer, the term of this patent is extended or adjusted under 35 U.S.C. 154(b) by 483 days.

(21) Appl. No.: 13/558,720

(22) Filed: Jul. 26, 2012

(65) Prior Publication Data

US 2014/0029288 A1 Jan. 30, 2014

(51) Int. Cl.
 *B60Q 1/06* (2006.01)
 *B60Q 1/068* (2006.01)

(52) U.S. Cl.
 CPC .......... *B60Q 1/0683* (2013.01); *B60Q 2200/36* (2013.01); *Y10T 29/49718* (2015.01)

(58) Field of Classification Search
 CPC .................................. B60Q 1/12; B60Q 1/124
 USPC .................... 362/523, 524, 525, 543
 See application file for complete search history.

(56) References Cited

U.S. PATENT DOCUMENTS

| 5,260,857 A | 11/1993 | Lukkarinen et al. |
| 5,530,629 A | 6/1996 | Uehara |
| 7,975,974 B2 | 7/2011 | Schaefer et al. |
| 2006/0023461 A1* | 2/2006 | Knight .......................... 362/466 |

\* cited by examiner

*Primary Examiner* — Andrew Coughlin
(74) *Attorney, Agent, or Firm* — Jacox, Meckstroth & Jenkins

(57) ABSTRACT

A vehicular lighting adjustment system (10) has a housing (12) with at least two headlamp adjusters (14), each headlamp adjuster (14) comprising a rocker arm (16) pivotally mounted about a pivot axis (X). A common adjuster (30) is mounted to the housing (12) for rotational displacement. Respective elevation tuning adjusters (34) bear on rocker arms (16) and are displaceable along the common adjuster (30) from an initial axial position to an adjusted axial position whereby each rocker arm (16) deflects about its pivot axis (X). The elevation tuning adjusters (34) are selectively fixed to the adjustment rod (30) in the adjusted axial position. After each elevation tuning adjuster (34) is fixed in its adjusted axial position to the common adjuster (30), displacement of the common adjuster (30) simultaneously displaces the headlamp adjusters (14) by pivotal motion of the rocker arms (16) about their respective said pivot axes (X).

10 Claims, 4 Drawing Sheets

MULTIPLE LAMP ELEMENT ADJUSTER FOR A VEHICLE

CROSS-REFERENCE TO RELATED APPLICATIONS

There is no cross-reference to a related application.

GOVERNMENT CONTRACT

This application is not the result of any government contract and the United States Government has no rights under this disclosure.

TECHNICAL FIELD

This embodiments disclosed herein relate to vehicle headlamps and more particularly to such headlamps employing multiple optical elements that require a specific alignment.

BACKGROUND ART

An increasing number of vehicle headlamps use light emitting diodes (LEDs).

These units are energy efficient; however, each individual unit is small and multiple units are required to provide an effective light beam to insure safe driving. Adjusting individual sources is to provide a legal headlamp system is difficult and time consuming Individual adjustment of multiple light sources is known, which may result in misalignment of the beam or the expenditure of considerable effort to insure that the beams are properly aimed. Known in the art are U.S. Pat. No. 7,975,974 (Schaefer); U.S. Pat. No. 5,530,629 (Uehara) and U.S. Pat. No. 5,260,857 (Lukkarinen).

DISCLOSURE OF EMBODIMENTS

It is an object to enhance the alignment of multiple optical sources.

In one aspect the embodiments shown a method of adjusting a headlamp component in a lighting system that has multiple headlamp optical elements. The method comprises: providing a plurality of independently adjustable headlamp optical elements; connecting each of the plurality of headlamp optical elements to a common adjuster; adjusting each of the plurality of headlamp optical element independently of another of the plurality of headlamp optical elements, relative to the common adjuster to a respective first orientation; and, after individually adjusting the plurality of headlamp optical elements, thereafter adjusting the common adjuster to simultaneously aim all of the plurality of headlamp optical elements from respective first orientations to respective second orientations.

In another aspect the embodiments provide a vehicular lighting adjustment system that has a housing and at least two headlamp adjusters, each headlamp adjuster comprising a rocker arm pivotally mounted about a pivot axis (X). Each of the rocker arms comprises a proximal end configured for connection to a headlamp optical element and a distal end having a bearing surface. A common adjuster is mounted to the housing for displacement relative to the housing. Elevation tuning adjusters are connected to the common adjuster. Each bearing surface receives a respective one of the plurality of elevation tuning adjusters. Each of the elevation tuning adjusters is mounted for displacement, such as axial displacement, along the common adjuster from an initial axial position to an adjusted axial position whereby each respective one of the rocker arms is caused to be deflected about its pivot axis (X), each of the elevation tuning adjusters being adapted to be selectively fixed to the adjustment rod in the adjusted axial position. After each elevation tuning adjuster is fixed in the adjusted axial position to the common adjuster, displacement of the common adjuster relative to the housing is transmitted by the elevation tuning adjusters to simultaneously displace the at least two headlamp adjusters by pivotal motion of the rocker arms about their respective said pivot axes (X). Thus, vertical alignment of multiple optical elements is achieved and vehicle headlamps are improved.

BEST MODE FOR CARRYING OUT THE EMBODIMENTS

For a better understanding of the present embodiments, together with other advantages and capabilities thereof, reference is made to the following disclosure, drawings and appended claims taken in conjunction with the above-described drawings.

Figure 1:
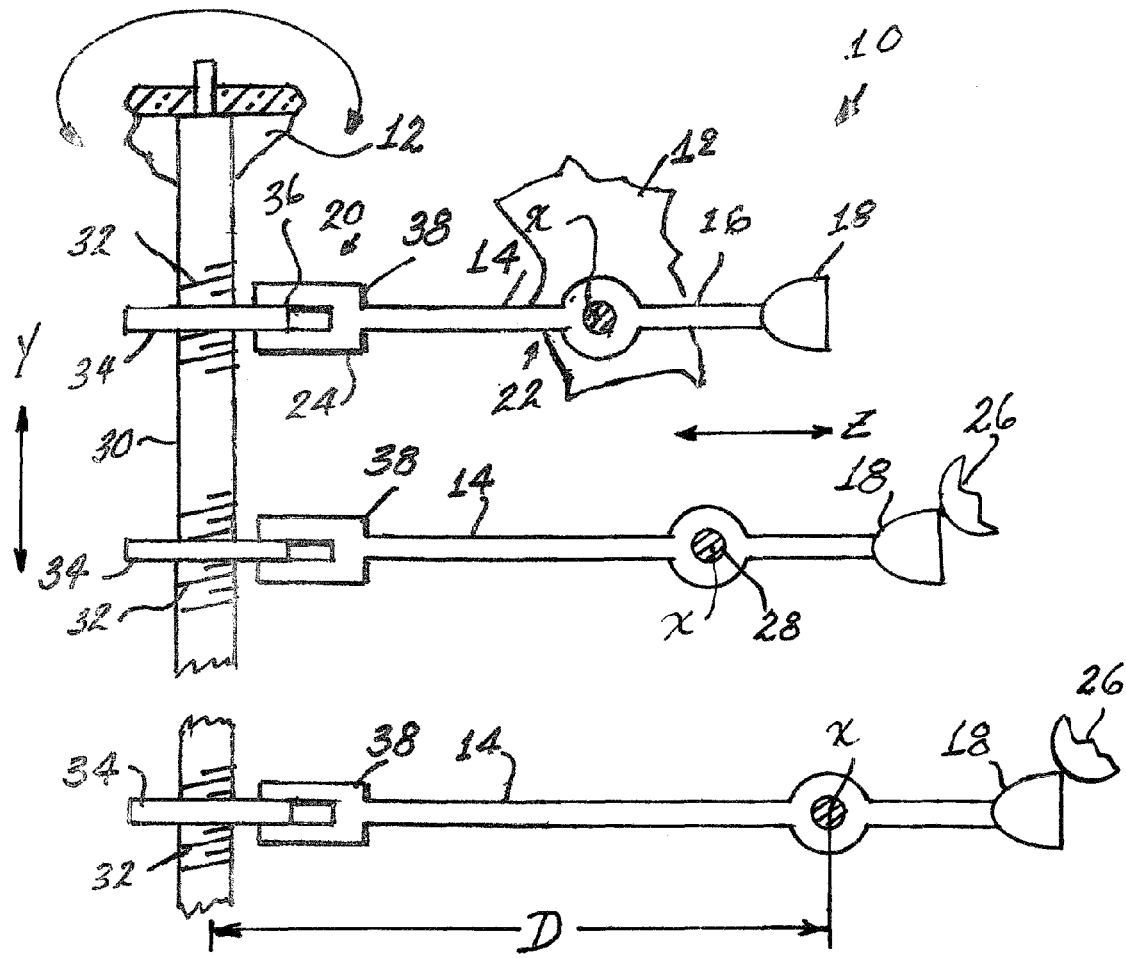
FIG. 1 is an elevation view of an embodiment.

FIG. 1 shows a vehicular lighting adjustment system 10 having a housing 12 with two or more headlamp adjusters 14 displaceably mounted in the housing 12. Each headlamp adjuster 14 has a rocker arm 16 pivotally mounted about a pivot axis (X) defined by a pivot region 28.

Each rocker arm 16 has a proximal end 18 configured for connection to a headlamp optical element 26, for example, a reflector or an LED light source, and a distal end 20 having a bearing surface 24. The proximal end 18 bears against or is coupled to a reflector or other optical element 26 such that a tipping action of rocker arm 16 levers the reflector or light source 26. A common adjuster 30 is mounted to the housing 12 for displacement relative to the housing 12, for example for rotational motion. The common adjuster 30 is advantageously a rod mounted for rotational displacement relative to the housing 12. Lamp adjuster rods adjusters are commonly torqued with a wrench or driver coupled to projecting stud 44 shown in FIG. 2.

Figure 4:
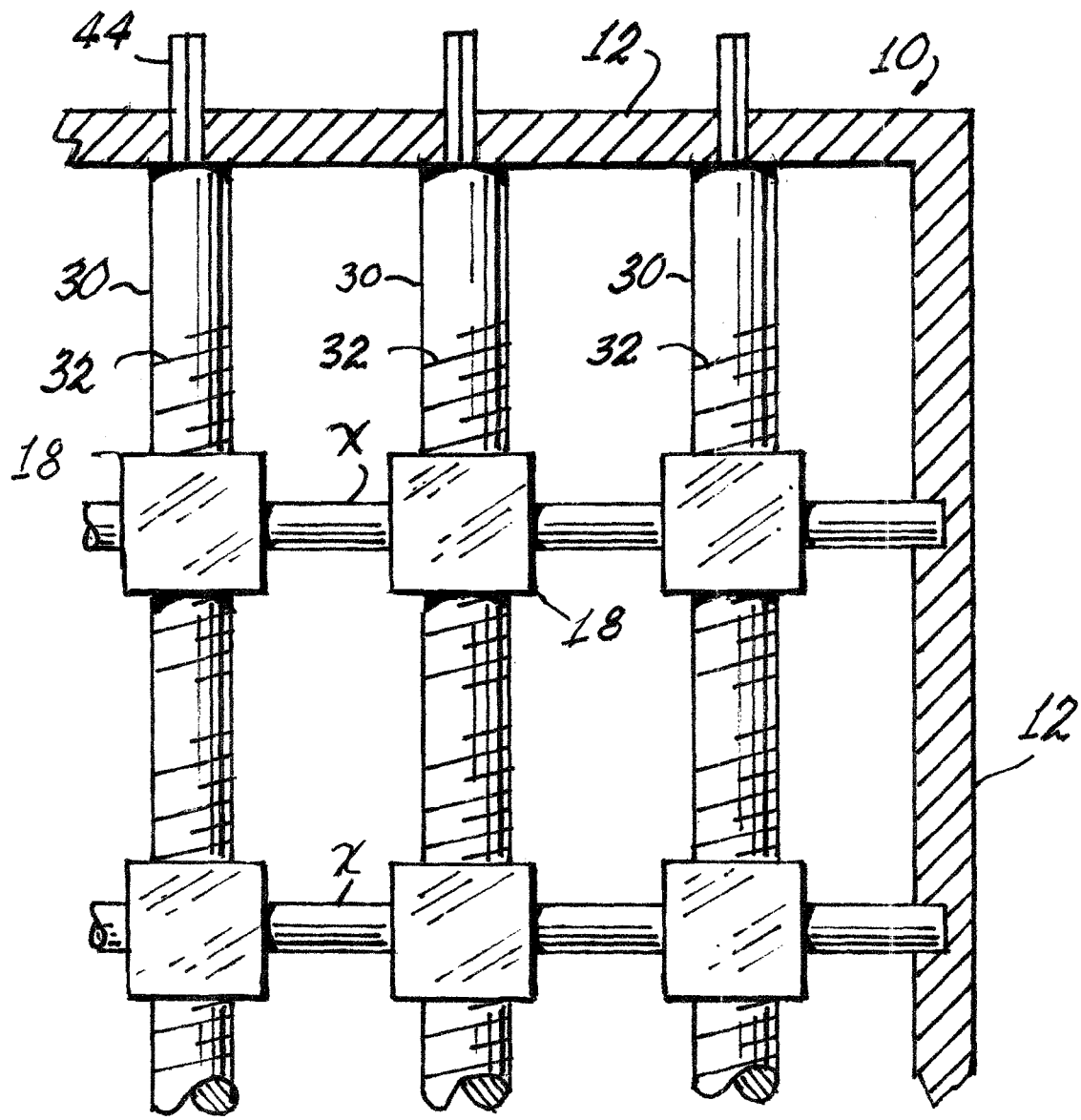
FIG. 4 is an elevation view of an embodiment.

In an embodiment shown in FIG. 4 multiple rows and columns of common adjusters 30 and headlamp adjusters 14 can be provided, At each proximal end 18 there can he an individual light source or reflector that is adjusted thereby.

Elevation tuning adjusters 34 are connected to the common adjuster 30, with each rocker arm's bearing surface 24 receiving a respective one of the plurality of elevation tuning adjusters 34.

Figure 2:
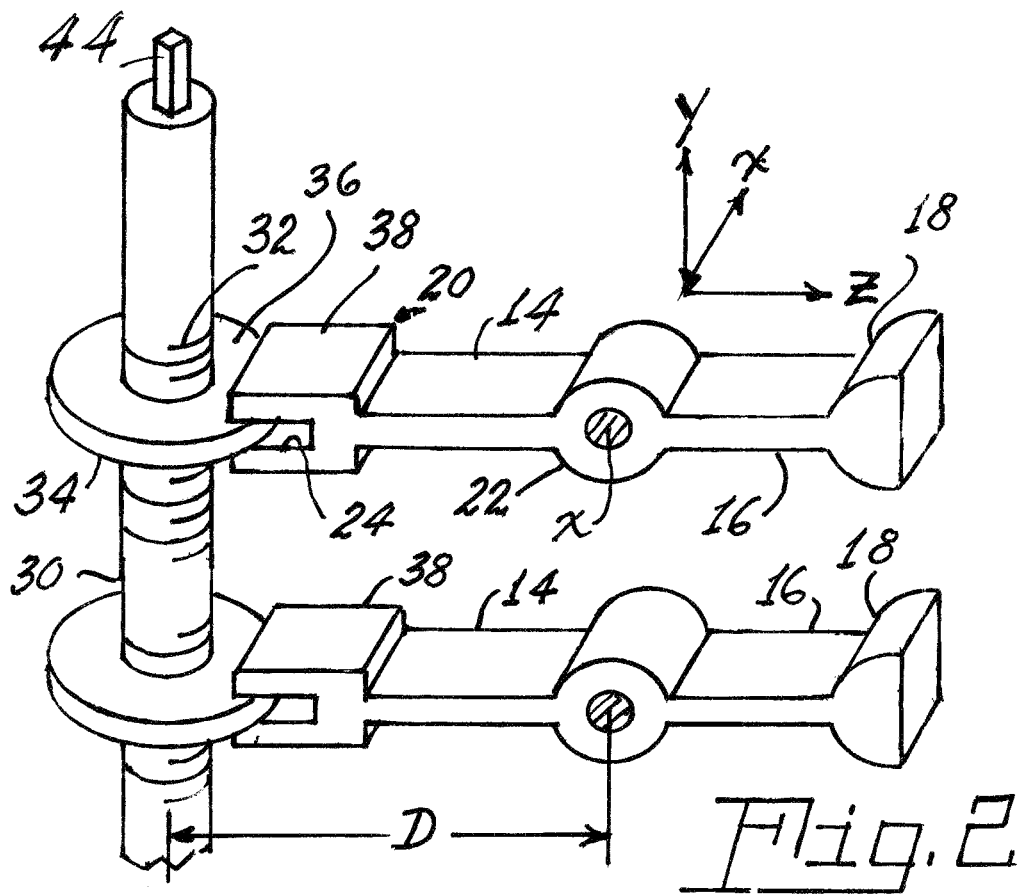
FIG. 2 is a perspective of an alternate embodiment.
Figure 5:
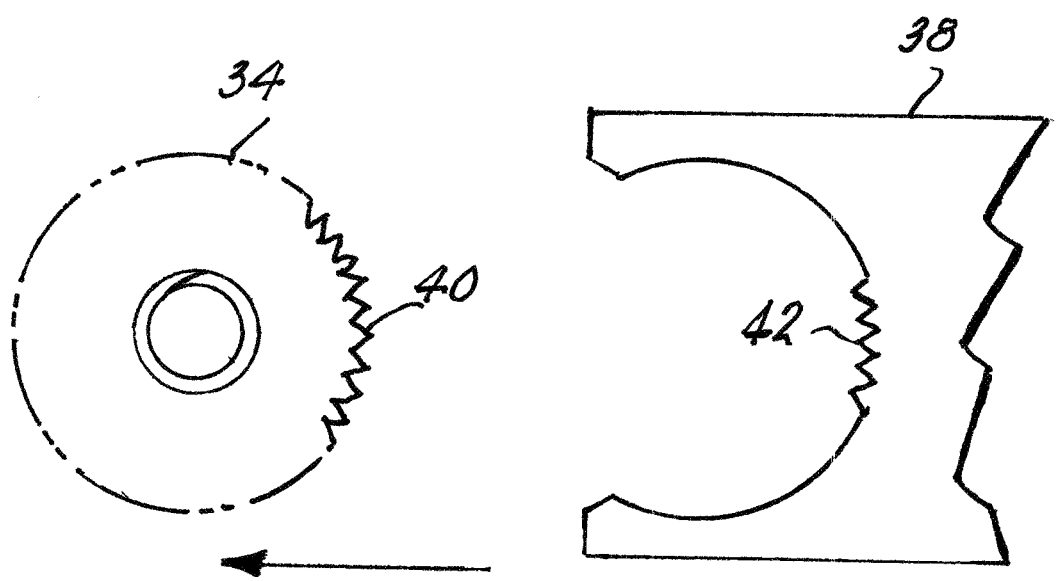
FIG. 5 is a plan view of an alternate tuning adjuster with latching.

Each of the elevation tuning adjusters 34 is mounted for displacement, such as axial displacement, along the common adjuster 30 from an initial axial position to an adjusted axial position whereby each respective rocker arm 16 is caused to be deflected about its pivot axis (X), each of the elevation tuning adjusters 34 being adapted to be selectively fixed to the adjustment rod 30 in an adjusted axial position. The adjustment can be made using threaded attachment of each tuning adjuster 34 to adjuster rod 30, as discussed with respect to FIG. 3 below. For ease of rotational adjustment, tuning adjuster 34 can be formed as a disc and referred to as a tuning nut. Fixation can be accomplished in numerous ways upon completion of the adjustment. For example, each yoke 38 can be glued or welded (such as by ultrasonic welding of plastics) to its respective elevation tuning adjuster 34. Alternatively, as shown in FIG. 5, each tuning adjuster 34 has a latching structure 40 that is lockingly engageable to a corresponding latch receiving portion 42 formed on the distal end 20 of the rocker arm 16. In the particular instance shown in FIG. 5, the latching structure 40 and the latch receiving portion 42 are teethed. After each elevation tuning adjuster 34 is fixed in its adjusted axial position to the common adjuster 30, displacement of the common adjuster 30 relative to the housing 12, via rotation of the common adjuster by turning the projecting stud 44, is transmitted by the elevation tuning adjusters 34 to simultaneously displace the headlamp adjusters 14 by pivotal motion of the rocker arms 16 about their respective pivot axes (X). Each of the axes (X) can be the same distance D from the common adjuster 30 as shown in FIG. 2 or the distance D can be different for respective rocker arms 14, as shown in FIG. 1, which can facilitate differential adjustment of the lamp optical element 26.

Figure 3:
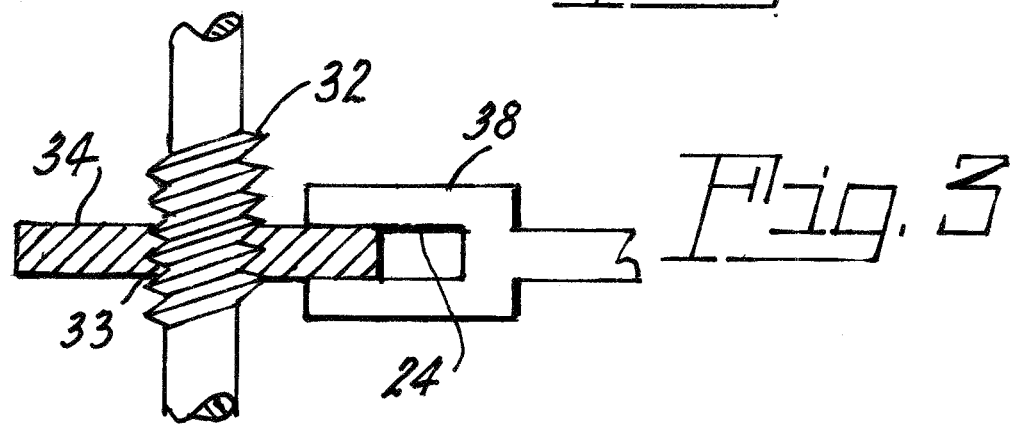
FIG. 3 is an enlarged sectional view of a threaded detail.

The common adjuster rod 30 extends along a rotational axis perpendicular to the rocker arm pivot axis (X) and includes at least one threaded section 32 and each elevation tuning adjuster 34 comprises a mating threaded portion 33, as shown in FIG. 3, operatively connected to the rod threaded section 32 and having an abutment surface 36 engaging the rocker arm bearing surface 24. As shown there is a threaded section 32 assigned to each threaded portion 33 of each tuning adjuster 34. In a preferred embodiment there are multiple threaded sections 32, which can have the same threads or differing threads, such as of different pitch. The use of differing threads facilitates that each of the rocker arms 16 can be adjusted at a different rate. The use of different thread pitches as between respective threaded adjuster discs 34 can be combined and matched with the use of different distances D as between respective rocker arms 14.

Each rocker arm bearing surface 24 comprises a yoke 38, and each elevation abutment surface 36 is received in a respective yoke 38. The yoke 38 advantageously has two laterally extending portions, one upper and one lower, joined by a bight; the upper and lower portions act as bearing surfaces for adjustment upwards or downwards.

The disclosed structure enables a convenient method of adjusting a headlamp component in a lighting system 10 having multiple headlamp optical elements 26. First there is provided a plurality of independently adjustable headlamp optical elements 26. Then each of the plurality of headlamp optical elements 26 is connected to a common adjuster 30. Then each of the plurality of headlamp optical elements 26 is individually adjusted relative to the common adjuster 30, independently of another of the plurality of headlamp optical elements 26, to its respective first orientation. Then after individually adjusting the plurality of headlamp optical elements 26 to the first orientations, the common adjuster 30 is adjusted so as to simultaneously aim the plurality of headlamp optical elements 26 from respective first orientations to respective second orientations.

While there have been shown and described what are at present considered to be the preferred embodiments, it will be apparent to those skilled in the art that various changes and modifications can be made herein without departing from the scope thereof as defined by the appended claims.

For purposes of this application it is to be understood that when an element or layer is referred to as being "on," "connected to" or "coupled to" another element or layer, it can be directly on, connected to or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. The term "and/or" includes any and all combinations of one or more of the associated listed items.

Although the terms "first," "second," "third" etc. may be used to describe various elements, components, regions, layers and/or sections, these elements, components, regions, layers and/or sections are not to be limited by theses terms as they are used only to distinguish one element, component, region, layer or section from another element, component, region, layer or section. Thus, a first element, component, region, layer or section could be termed a second element, component, region, layer or section without departing from the scope and teachings of the present embodiments.

Spatially relative terms, such as "beneath," below," upper," "lower," and the like may be used herein for ease of description to describe one element's relationship to another element(s) as illustrated in the drawings. These spatially relative terms are intended to encompass different orientations of the device in use or operation in addition to the orientation shown in the drawings. For example, if the device in the drawings is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the term "comprises" specifies the presence of stated features, steps, or components, but does not preclude the presence of one or more other features, steps, components, and/or groups thereof.

GLOSSARY OF REFERENCE NUMBERS

10 Lighting system
12 Housing
14 Headlight adjuster
16 Rocker arm
18 Proximal end of rocker arm
19 Headlamp optical element
20 Distal end of rocker arm
22 Intermediate portion of rocker arm
24 Bearing surface
26 Optical element
28 Pivot
30 Adjustment rod
32 Threaded section of adjustment rod
33 Mating threaded portion
34 Elevation tuning adjusters
36 Abutment surface of adjuster
38 Yoke
40 Latching structure
42 Latch receiving portion
44 Projecting stud
X Pivot axis

What is claimed is:

1. A vehicular lighting adjustment system, comprising:
a housing;
at least two headlamp adjusters, each of said at least two headlamp adjusters comprising a rocker arm pivotally mounted about a pivot axis;
each said rocker arm comprising a proximal end configured for connection to a headlamp optical element and a distal end having a bearing surface;
a common adjuster mounted to said housing for displacement relative said housing;
a plurality of elevation tuning adjusters connected to said common adjuster;
each said bearing surface receiving a respective one of said plurality of elevation tuning adjusters;
each said plurality of elevation tuning adjusters mounted for displacement along said common adjuster from an initial position to an adjusted position whereby each respective said rocker arm is caused to be deflected about its said pivot axis (X), each said elevation tuning adjuster being adapted to be selectively fixed to said common adjuster in said adjusted position; and
whereby after each said plurality of elevation tuning adjusters is fixed in said adjusted position to said common adjuster, displacement of said common adjuster relative to said housing is transmitted by said plurality of elevation tuning adjusters to simultaneously displace said at least two headlamp adjusters by pivotal motion of said rocker arms about their respective said pivot axes (X).

2. The vehicular lighting adjusting system of claim 1, wherein said at least two headlamp adjusters are displaceably mounted in said housing and said rocker arm pivot axes (X) are connected to said housing.

3. The vehicular lighting adjusting system of claim 1, wherein said common adjuster defines a rod mounted for rotational displacement relative said housing.

4. The vehicular lighting adjusting system of claim 3, wherein said common adjuster extends along a rotational axis perpendicular to said rocker arm pivot axis (X); said common adjuster includes at least one threaded section and each said plurality of elevation tuning adjusters comprises a mating threaded portion operatively connected to said at least one threaded section and having an abutment surface engaging said bearing surface.

5. The vehicular lighting adjusting system of claim 4, wherein said common adjuster has a plurality of threaded sections each in cooperative engagement with respective said threaded portions.

6. The vehicular lighting adjusting system of claim 1, wherein each said bearing surface comprises a yoke, and each said plurality of elevation tuning adjusters comprises an abutment surface received in a respective said yoke.

7. The vehicular lighting adjusting system of claim 1, wherein said headlamp optical element comprises a lamp reflector.

8. The vehicular lighting adjusting system of claim 1, wherein at least one said plurality of elevation tuning adjusters defines a latching structure lockingly engageable to a corresponding latch receiving portion formed on said distal end of said rocker arm.

9. The vehicular lighting adjusting system of claim 8, wherein said latching structure and said latch receiving portion are teethed.

10. The vehicular lighting adjusting system of claim 1, wherein the displacement of said plurality of elevation tuning adjusters is axial along said common adjuster, said initial position being an initial axial position and said adjusted position being an adjusted axial position.

* * * * *

UNITED STATES PATENT AND TRADEMARK OFFICE
CERTIFICATE OF CORRECTION

PATENT NO. : 9,102,264 B2  Page 1 of 1
APPLICATION NO. : 13/558720
DATED : August 11, 2015
INVENTOR(S) : King It is certified that error appears in the above-identified patent and that said Letters Patent is hereby corrected as shown below:

In the specification

Column 2, line 50, delete "he" and insert -- be -- therefore.

Signed and Sealed this
Sixteenth Day of August, 2016

Michelle K. Lee
*Director of the United States Patent and Trademark Office*